United States Patent
Zhang et al.

(10) Patent No.: US 11,521,161 B2
(45) Date of Patent: Dec. 6, 2022

(54) AUTOMATIC DETERMINATION OF PICKUP WAIT TIMES

(71) Applicant: Walmart Apollo, LLC, Bentonville, AR (US)

(72) Inventors: Shengyang Zhang, Santa Clara, CA (US); Mingang Fu, Palo Alto, CA (US); Madhavan Kandhadai Vasantham, Dublin, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 289 days.

(21) Appl. No.: 16/712,764

(22) Filed: Dec. 12, 2019

(65) Prior Publication Data
US 2020/0242553 A1 Jul. 30, 2020

Related U.S. Application Data

(60) Provisional application No. 62/798,902, filed on Jan. 30, 2019.

(51) Int. Cl.
*G06Q 10/08* (2012.01)
*G06N 20/00* (2019.01)
(Continued)

(52) U.S. Cl.
CPC ........... *G06Q 10/0836* (2013.01); *G06N 3/08* (2013.01); *G06N 20/00* (2019.01);
(Continued)

(58) Field of Classification Search
CPC ........ G06Q 10/0836; G06Q 10/08355; H04W 4/029; H04W 4/021; G06N 20/00; G06N 3/08
(Continued)

(56) References Cited

U.S. PATENT DOCUMENTS 10,762,462 B1 * 9/2020 Hapgood ............... G01C 21/12
10,921,147 B1 * 2/2021 Hapgood ......... G06Q 10/06311
(Continued)

FOREIGN PATENT DOCUMENTS

WO 2017119212 7/2017

OTHER PUBLICATIONS

"Real-time control of express pickup and delivery processes in a dynamic environment" Published by Institute of business computing and operations research, University of Wuppertal (Year: 2014).*

*Primary Examiner* — Zeina Elchanti
(74) *Attorney, Agent, or Firm* — Bryan Cave Leighton Paisner LLP

(57) ABSTRACT

A system including one or more processors and one or more non-transitory computer-readable media storing computing instructions configured to run on the one more processors and perform training a machine learning model based on historical input data for pickups by users that occurred during a historical time period and output data comprising actual wait times that occurred for the pickups by the users; receiving an order from a user for a pickup from a physical store during a selected time slot of a selected date; adding the order to a queue of assembled checked-in orders; determining an estimated arrival time based on geo-tracking; generating an estimated wait time using the machine learning model, as trained, and can be based on input data; and sending the estimated wait time to at least one of the physical store or the mobile device of the user. Other embodiments are disclosed.

20 Claims, 5 Drawing Sheets

(51) Int. Cl.
  *H04W 4/021*  (2018.01)
  *G06N 3/08*  (2006.01)
  *H04W 4/029*  (2018.01)

(52) U.S. Cl.
  CPC ...... *G06Q 10/08355* (2013.01); *H04W 4/021* (2013.01); *H04W 4/029* (2018.02)

(58) Field of Classification Search
  USPC ........................................................ 705/339
  See application file for complete search history.

(56) References Cited

U.S. PATENT DOCUMENTS

| | | |
|---|---|---|
| 10,937,059 B1 | 3/2021 | Sudul et al. |
| 11,182,864 B1 * | 11/2021 | Fox .................... G06Q 30/0635 |
| 11,222,289 B2 * | 1/2022 | Akselrod ............. G01C 21/343 |
| 2003/0110142 A1 | 6/2003 | Sesek et al. |
| 2008/0140515 A1 | 6/2008 | Godwin |
| 2009/0252318 A1 | 10/2009 | Smith et al. |
| 2012/0016745 A1 | 1/2012 | Hendrickson |
| 2012/0321073 A1 | 12/2012 | Flockhart et al. |
| 2013/0022195 A1 | 1/2013 | Nimmagadda |
| 2013/0223619 A1 | 8/2013 | Kohler et al. |
| 2016/0063604 A1 | 3/2016 | Shaffer et al. |
| 2016/0092845 A1 | 3/2016 | Vogan |
| 2016/0127382 A1 | 5/2016 | Li et al. |
| 2016/0140490 A1 | 5/2016 | Kliper |
| 2016/0148300 A1 | 5/2016 | Carr et al. |
| 2016/0283953 A1 | 9/2016 | Ettl et al. |
| 2017/0300966 A1 | 10/2017 | Dereszynski et al. |
| 2018/0082352 A1 | 3/2018 | Mattingly et al. |
| 2018/0082353 A1 | 3/2018 | Mattingly et al. |
| 2018/0082356 A1 | 3/2018 | Wilkinson et al. |
| 2018/0253805 A1 | 9/2018 | Kelly et al. |
| 2018/0308023 A1 | 10/2018 | Bansal et al. |
| 2018/0308025 A1 | 10/2018 | Bansal et al. |
| 2018/0349788 A1 | 12/2018 | Sarkar et al. |
| 2019/0164126 A1 * | 5/2019 | Chopra ............ G06Q 10/08355 |
| 2020/0151800 A1 * | 5/2020 | Tseng ................ G01C 21/3697 |

* cited by examiner

AUTOMATIC DETERMINATION OF PICKUP WAIT TIMES

CROSS-REFERENCE TO RELATED APPLICATIONS

This application claims the benefit of U.S. Provisional Application No. 62/798,902, filed Jan. 30, 2019. U.S. Provisional Application No. 62/798,902 is incorporated herein by reference in its entirety.

TECHNICAL FIELD

This disclosure relates generally to automatic determination of pickup wait times.

BACKGROUND

When a user picks up an order at a retail location at a designed pickup time, the user sometimes waits for the order to be dispensed. Wait times can change throughout the day, and can be affected by various reasons. For example, wait times can be affected by the number of users picking up orders, the number of workers available to dispense the orders, and the number of users that arrive unexpectedly to pick up orders, among other factors. Many of these factors can be difficult to predict.

BRIEF DESCRIPTION OF THE DRAWINGS

To facilitate further description of the embodiments, the following drawings are provided in which.

Figure 1:
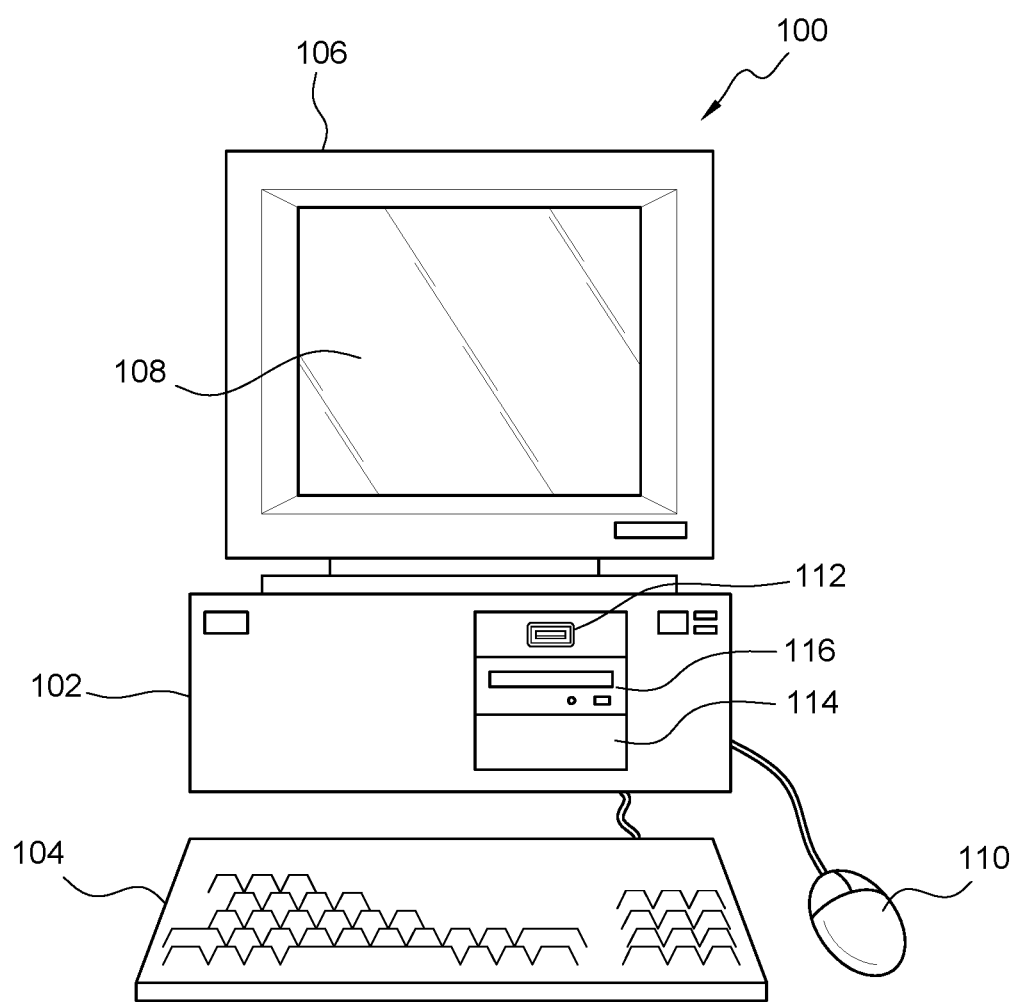
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
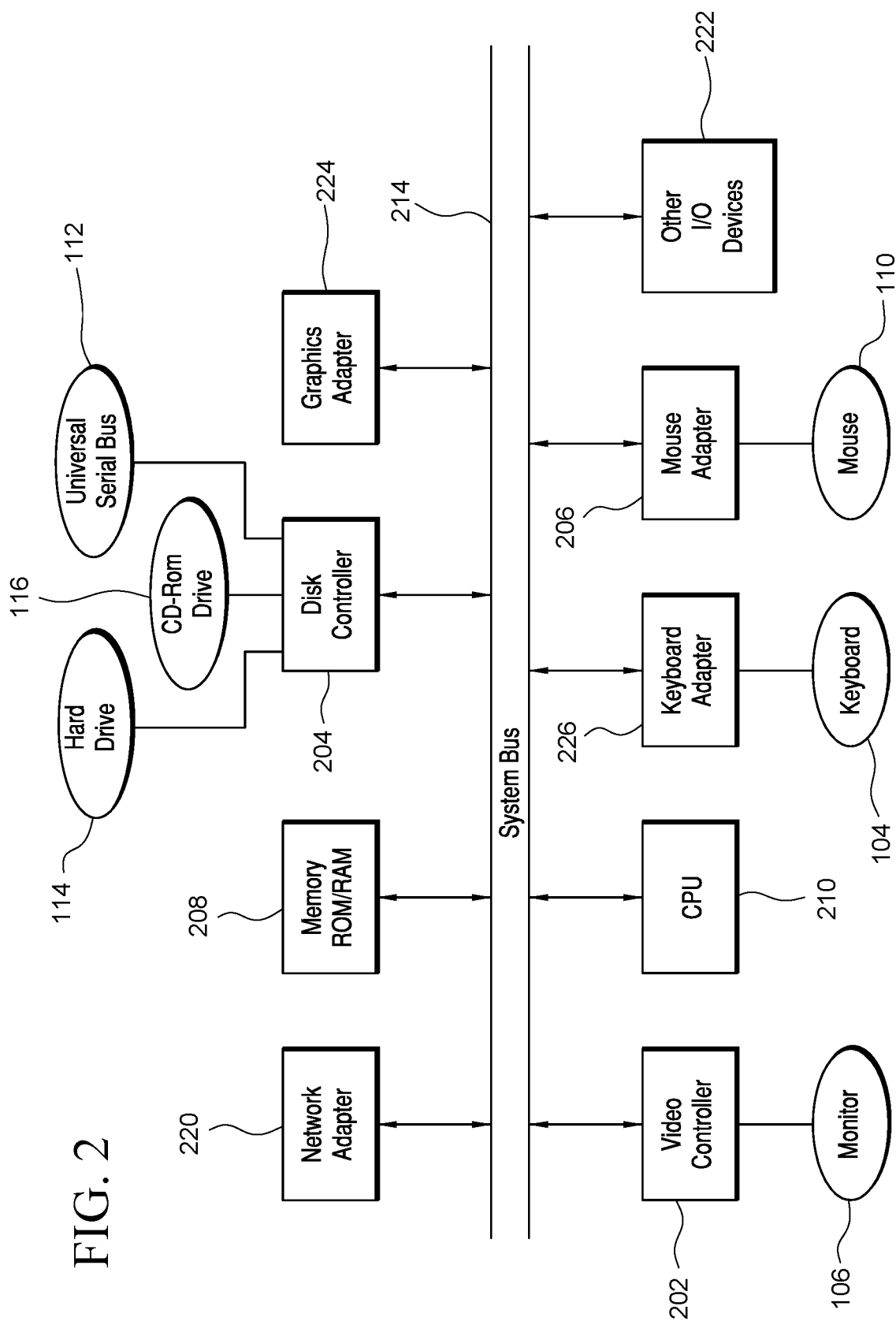
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
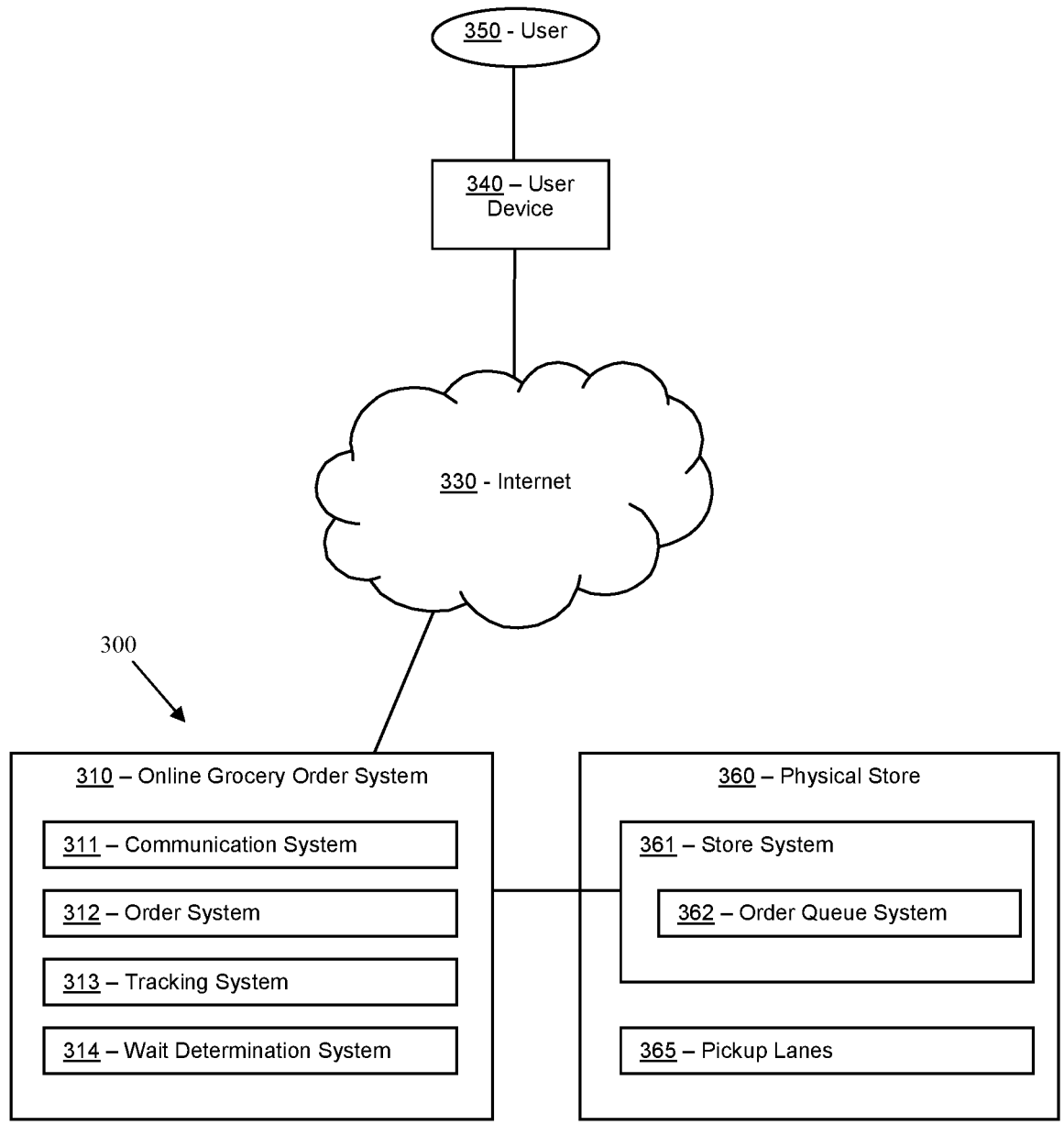
FIG. 3 illustrates a block diagram of a system that can be employed for automatic determination of pickup wait times, according to an embodiment.

Turning ahead in the drawings, FIG. 3 illustrates a block diagram of a system 300 that can be employed for automatic determination of pickup wait times, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include an online grocery order system 310 and/or a store system 361. Online grocery order system 310 and/or store system 361 can each be a computer system, such as computer system 100 (FIG. 1), as described above, and can each be a single computer, a single server, or a cluster or collection of computers or servers, or a cloud of computers or servers. In another embodiment, a single computer system can host online grocery order system 310 and/or store system 361. Additional details regarding online grocery order system 310 and/or store system 361 are described herein.

In some embodiments, online grocery order system 310 can be in data communication through Internet 330 with one or more user devices, such as a user device 340. In some embodiments, user device 340 can be used by users, such as a user 350. In many embodiments, online grocery order system 310 can host one or more websites and/or mobile application servers. For example, online grocery order system 310 can host a website, or provide a server that interfaces with a mobile application on user device 340, which can allow users to browse and/or search for items (e.g., products, grocery items), to add items to an electronic cart, to purchase items, and/or request grocery pickup, in addition to other suitable activities.

In some embodiments, an internal network that is not open to the public can be used for communications between online grocery order system 310 and store system 361 within system 300. In these or other embodiments, operators and/or administrators of system 300 can manage system 300, the processor(s) of system 300, and/or the memory storage unit(s) of system 300 using the input device(s) and/or display device(s) of system 300, or portions thereof in each case.

In certain embodiments, the user devices (e.g., user device 340) can be desktop computers, laptop computers, a mobile device, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, online grocery order system 310 and/or store system 361 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to online grocery order system 310 and/or store system 361 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of online grocery order system 310 and/or store system 361. In a similar manner, the processors and/or the non-transitory computer-readable media can be local and/or remote to each other.

Meanwhile, in many embodiments, online grocery order system 310 and/or store system 361 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between online grocery order system 310, store system 361, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In several embodiments, online grocery order system 310 can be in data communication with multiple store systems, which can include store system 361. In several embodiments, each store system (e.g., 361) can be located in a different physical store, such as a physical store 360. In many embodiments, the physical stores (e.g., 360) each can be a brick-and-mortar store that is associated (e.g., operated by a common business entity or entities under common control) with online grocery order system 310. In a number of embodiments, physical store 360 can be a grocery store or a larger store (e.g., a super store) that include a grocery store or grocery department. In other embodiments, physical store 360 can be a department store or other retail store that does not sell groceries. In many embodiments, online grocery order system 310 can allow a user (e.g., 350) to order items that are sold at physical store 360, and allow the user (e.g., 350) to select a time slot in the future, such as later in the day, to pick up the items in the order from physical store 360. In some embodiments, store system 361 can be a distributed system that includes one or more systems in each of the physical stores (e.g., 360). In other embodiments, store system 361 can be a centralized system that communicates with systems in the physical stores (e.g., 360).

In many embodiments, online grocery order system 310 can include a communication system 311, an order system 312, a tracking system 313, and/or a wait determination system 314. In several embodiments, store system 361 can include an order queue system 362. In many embodiments, the systems of online grocery order system 310 and/or store system 361 can be modules of computing instructions (e.g., software modules) stored at non-transitory computer readable media that operate on one or more processors. In other embodiments, the systems of online grocery order system 310 and/or store system 361 can be implemented in hardware. Online grocery order system 310 and/or store system 361 each can be a computer system, such as computer system 100 (FIG. 1), as described above, and can be a single computer, a single server, or a cluster or collection of computers or servers, or a cloud of computers or servers. In another embodiment, a single computer system can host online grocery order system 310 and/or store system 361. Additional details regarding online grocery order system 310 and/or store system 361 and the components thereof are described herein.

In several embodiments, online grocery order system 310 can receive an order for pickup from a user (e.g., 350), such as by using an order system 312 of online grocery order system 310. In some embodiments, online grocery order system 310 can allow user 350 to select a time slot (e.g., an hour long window of time) during which the user plans to pick up the order. After the order has been received at online grocery order system 310, the order can be sent to store system 361, to allow associates at physical store 360 to pick the items in the order and assemble the order for pickup. Once the order has been picked and assembled, store system 361 can notify online grocery order system 310. In many embodiments, online grocery order system 310 can send a message to user 350, such as by using communication system 311 of online grocery order system 310, to allow user 350 to check-in, which indicates that user 350 is starting to travel to physical store 360 to pick up the order.

In many embodiments, once user 350 has checked in using user device 340, online grocery order system can track the location of user device 340 and user 350, such as by using a tracking system 313 of online grocery order system 310. In several embodiments, online grocery order system 310 and/or store system 361 can determine an estimated arrival time of user 350 at physical store 360 based on the information received from tracking system 313. In many embodiments, online grocery order system 310 can determine an estimated wait time, such as by using a wait determination system 314 of online grocery order system 310. This estimated wait time can indicate the amount of time user 350 can expect to wait after arriving at physical store 360 until the dispensing of the order to user 350 is complete. In several embodiments, store system 361 can add the orders for which the users (e.g., 350) have checked-in to a queue, such as by using order queue system 362 of store system 361. In many embodiments, the queue can include orders in which the users (e.g., 350) have already checked in for physical store 360, which indicates the orders that the associate at physical store 360 can be responsible for handling in the near term.

When a user (e.g., 350) arrives at physical store 360, the user can park a vehicle of the user in one of pickup lanes 365 at physical store 360. In several embodiments, physical store 360 can include one or more pickup lanes 365. Having multiple pickup lanes (e.g., 365) at physical store 360 can result in orders being delivered to the user (e.g., 350) in an order that is not necessarily in the order of arrival of the vehicles of the users (e.g., 350) in pickup lanes 365 (e.g., not necessarily first-in-first-out). For example, serving a user (e.g., 350) in a first pickup lane of pickup lanes 365 can take longer than serving a user (e.g., 350) in a second pickup lane of pickup lanes 365, which can result in a subsequent user in the second pickup lane being served before a subsequent user in the first pickup lane, even if the subsequent user in the first pickup lane arrived before the subsequent user in the second pickup lane. Some orders involve additional changes or substitutions to the order, and some associates of physical store 360 and users (e.g., 350) spend more time talking to each other when pickup orders are being dispensed in pickup lanes 365.

Wait times for users (e.g., 350) in pickup lanes 365 can change dynamically throughout the day and can be affected by the number of users (e.g., 350) that are in pickup lanes at a particular time, the size of the orders (e.g., number of bags) to be dispensed, the number of associates of physical store 360 that are available to dispense the order to the users (e.g., 350), the number of users (e.g., 350) that arrive to pick up orders without previously checking in, the number of users (e.g., 350) that arrive to pick up orders outside the scheduled time slots for the users, and/or other factors. Many of these factors can be hard to predict, which makes conventional subjective estimates unreliable.

In many embodiments, users can order delivery orders, which can be treated by physical store 360 similarly to pick up orders. For delivery orders, a user (e.g., 350) can place an order, and the order can be picked up by a delivery driver, which can deliver the order to the user (e.g., at a residence of the user). The pickup process can be treated similarly in a delivery order to that of a pickup order, as the delivery driver can check-in and come to pick lanes 365 of physical store 360 for the order to be dispensed.

In several embodiments, the estimated wait time can be sent to the user (e.g., 350) and/or the delivery driver to inform the user (e.g., 350) and/or the delivery driver of an expected wait time in pickup lanes 365 after arriving at physical store 360. In many embodiments, the estimated wait time can be sent to the user and/or delivery driver at the time of, or shortly after, check-in, which can allow those using the pickup service to plan their time. In some embodiments, if the estimated wait time is longer than a predetermined threshold (e.g., 5 minutes, 10 minutes, 15 minutes, 20 minutes, or another suitable length of time), online grocery order system 310 can send a message to the user (e.g., 350) with a suggested later arrival time, which can be a later time in which the wait time is estimated to be shorter. In many embodiments, the estimated wait time can be used by physical store 360 for planning purposes, such as to plan how many associates to work in servicing pickup orders, and/or to determine how many pickup openings to allow for each time slot, which can change throughout the day.

Figure 4:
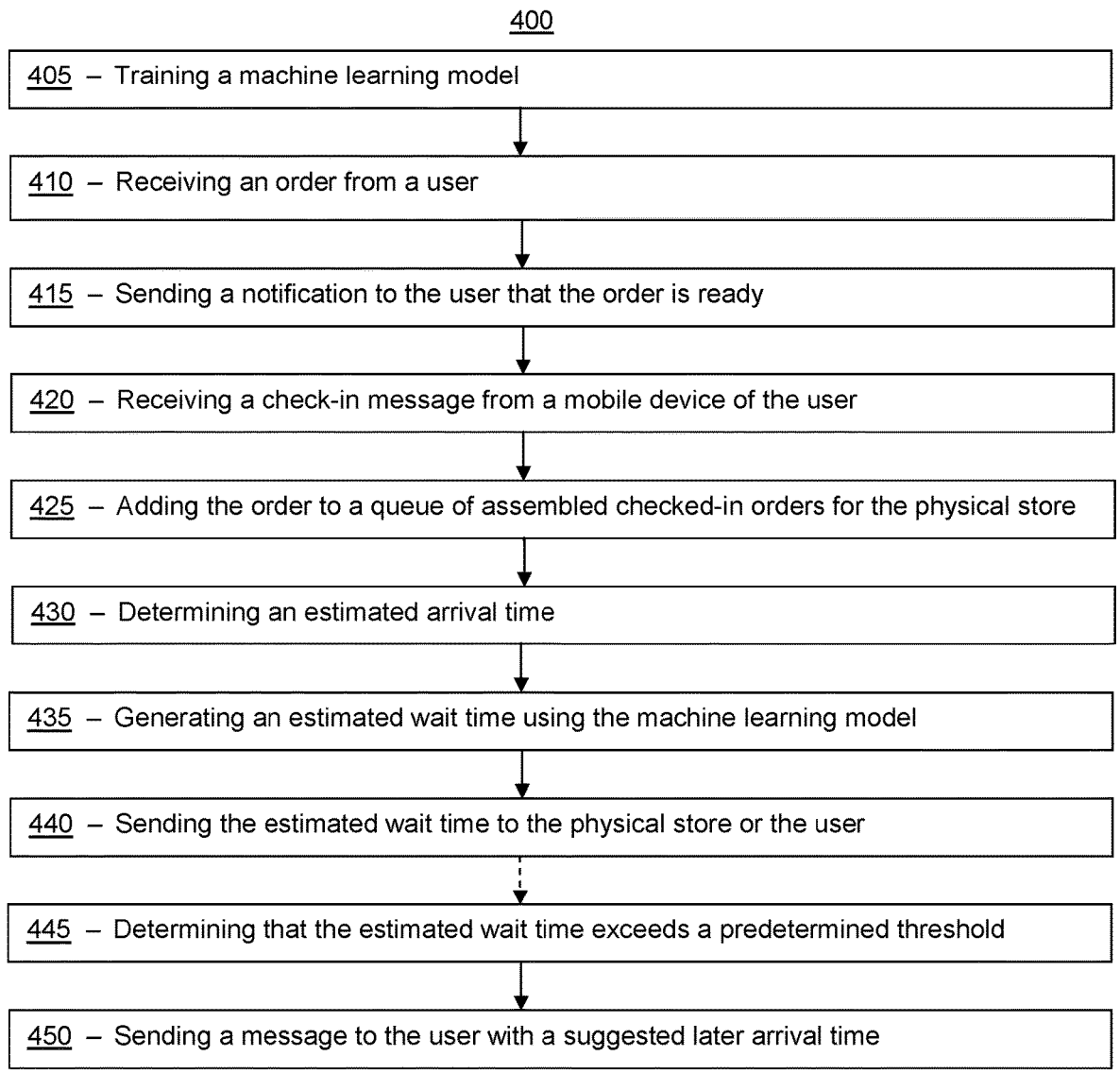
FIG. 4 illustrates a flow chart for a method, according to another embodiment.

Turning ahead in the drawings, FIG. 4 illustrates a flow chart for a method 400, according to an embodiment. In some embodiments, method 400 can be a method of providing an automatic determination of pickup wait times. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, online grocery order system 310 (FIG. 3) and/or store system 361 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as online grocery order system 310 (FIG. 3) and/or store system 361 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 405 of training a machine learning model based on historical input data for pickups by users that occurred during a historical time period and output data comprising actual wait times that occurred for the pickups by the users. In many embodiments, the machine learning model can include a gradient boosting model, but in other embodiments, other suitable machine learning models can be used. In some embodiments, a gradient boosting model can be implemented through the XGBoost open source software package written in Python. In many embodiments, the historical input data can be input into the gradient boosting model for training as input patterns (X) in XGBoost, and the output data can be input into the gradient boosting model for training as output patterns (Y) in XGBoost. This input data and output data for training can be used to train the gradient boosting model using a classification model in XGBoost, such as XGBClassifier, which can be created and fit to the training data. In some embodiments, a set of parameters (e.g., 20 parameters, for example, or another suitable number of parameters) can be used to train the model and tune the model to fit the training data. For example, the number of decision trees, the size of the decision trees, the maximum depth of each decision tree, and/or other suitable parameters can be tuned to train the gradient boosting model. In many embodiments, historical data not included in the training data can be used as test data to test and tune the gradient boosting model, as described below in further detail.

In many embodiments, the historical input data and the output data can be data collected during the historical time period, such as a previous period of six months, nine months, twelve months, eighteen months, twenty-four months, or another suitable period of time. In many embodiments, the historical input data and the output data can include data for each of the pickup orders that occurred during the historical time period. For example, for each pickup order, the input data can include order information (e.g., the number of orders that were in the queue of assembled checked-in orders at the physical store at the time of the check-in, the number of bags that were in each of the assembled checked-in orders in the queue, whether the order was a delivery, and if so, in some embodiments, the delivery service used, whether the order was an express order or a regular order, and/or other suitable information), the estimated arrival time that was determined at the time of check-in, historical information about the user when the check-in for the order occurred (e.g., a historical average wait time for the user when the check-in for the order occurred, a historical check-in percentage for the user when the check-in for the order occurred, and/or other suitable information), historical information about the physical store when the check-in for the order occurred (e.g., a historical average wait time for the physical store when the check-in for the order occurred, a historical average quantity of pickup associates for the physical store when the check-in for the order occurred, and/or other suitable information), dynamic wait time data for the physical store when the check-in for the order occurred (e.g., an average hourly wait time at the physical store for each time slot that occurred earlier in the day before the time slot for the order, an average daily wait time at the physical store on each day of the week occurring before the order, an average day-of-the-week wait time at the physical store on the same weekday earlier in the month for the weekday corresponding to the order, and/or other suitable information), the difference between the predicted arrival time and the actual arrival time, and/or other suitable information. The historical information about the user and/or the historical check-in percentage for the user can be blank or empty if the user is a new user. In many embodiments, the historical input data used for each historical order can match the input data used to determine the wait time for a current order, as described below in further detail. In many embodiments, the output data for a specific historical order used in the training of the machine learning model can be the actual wait time experienced by the user (e.g., 350 (FIG. 3)) from the time the user arrived at the physical store (e.g., 360 (FIG. 3)) until the dispensing of the order was complete.

In several embodiments, method 400 also can include a block 410 of receiving an order from a user for a pickup from a physical store during a selected time slot of a selected date. The users can be similar or identical to user 350 (FIG. 3). The physical store can be similar or identical to physical store 360 (FIG. 3). In many embodiments, the order for the pickup can be a grocery order for a grocery pickup and the physical store can be or include a grocery store. In other embodiments, the order can be for a non-grocery pickup order. For example, the physical store can be a department store or other retail store that does not sell groceries. In many embodiments, the physical store can include multiple pickup lanes. In several embodiments, a website and/or mobile application interfacing with an online grocery order system, such as online grocery order system 310 (FIG. 3), can be used by the user to select the items in the order. In a number of embodiments, the online grocery order system can present time slots to the user for pickup, such as hour-long time periods occurring later in the day or the following morning. The user can select the selected time slot on the selected date, and this information can be received by the online grocery order system.

In a number of embodiments, method 400 additionally can include, after items for the order have been picked and assembled at the physical store, a block 415 of sending a notification to the user that the order is ready to be picked up by the user. In many embodiments, the order can be picked and assembled at the physical store, after which the physical store can notify the online grocery order system that the order is ready for pickup. The online grocery order system that the order can then send the notification to the user. For example, a push notification to a mobile application on the user device, such as user device 340 (FIG. 3), an email, a text, or a message of another suitable message format, can be sent to the user. In many embodiments, the message can inform the user that the order is ready to be picked up. In a number of embodiments, the message can include a link, button, or other element that allows the user to check-in. The check-in can indicate that the user plans to leave at that time or soon thereafter to travel to the physical store to pick up the order.

In several embodiments, method 400 further can include a block 420 of receiving a check-in message from a mobile device of the user. The mobile device can be similar or identical to user device 340 (FIG. 3). In several embodiments, the check-in message can be sent from the user after the user receives the notification sent in block 415.

In a number of embodiments, method 400 additionally can include a block 425 of adding the order to a queue of assembled checked-in orders for the physical store. For example, after the user has checked-in, the online grocery order system can add the order to a queue of orders that have been assembled and that have been checked-in for the physical store. In many embodiments, this queue can reside in the online grocery order system that the order and/or in the store system at the physical store (such as store system 361 (FIG. 3)).

In several embodiments, method 400 further can include a block 430 of determining an estimated arrival time based on geo-tracking of the mobile device of the user. For example, after check-in by the user, the mobile application on the user device can use location determination capabilities in the user device, such as global positioning system (GPS) capabilities or other Wi-Fi location capabilities, to determine the location of the user and determine, based on distance, current traffic conditions, and/or other suitable factors, how long it is likely to take for the user to drive to the physical store. This information can be used to determine the estimated arrival time.

In a number of embodiments, method 400 additionally can include a block 435 of generating an estimated wait time using the machine learning model, as trained, and based on input data comprising the estimated arrival time, order information for each assembled checked-in order in the queue of assembled checked-in orders, historical information about the user, historical information about the physical store, and dynamic wait time data for the physical store. In several embodiments, the estimated wait time can be output from the machine learning model based on the input data. In many embodiments, the estimated wait time can include a number of minutes that the user can expect to wait at the physical store after arriving at the physical store until dispensing of the order to the user is complete. In some embodiments, the estimated wait time can include a range of time periods within a predetermined time range or confidence interval. For example, the predetermined confidence interval can be set to approximately 90%, 80%, 70%, 60%, 50%, or another suitable confidence interval. The time range can be plus or minus 30 seconds, 1 minute, 1.5 minutes, 2 minutes, 2.5 minutes, 3 minutes, 3.5 minutes, 4 minutes, 4.5 minutes, or 5 minutes, for example.

In many embodiments, the order information can include a quantity of orders in the queue of assembled checked-in orders, a quantity of bags in the each assembled checked-in order in the queue of assembled checked-in orders, whether the order is a delivery, the delivery service being used (e.g., Uber, Door Dash, etc.), whether the order is an express order or a regular order, and/or other suitable information about the current order or other orders currently in the queue.

In several embodiments, the historical information about the user can include a historical average wait time for the user (e.g., how long the user for this particular order has waited, on average, in the past), a historical check-in percentage for the user (e.g., how often this user for this particular order has checked-in for the pickup in the past instead of simply showed up for the pickup without first checking-in), and/or other suitable historical information about the user for the current order.

In many embodiments, the historical information about the physical store can include a historical average wait time for the physical store (e.g., how long a user, on average across all pickups at the physical store, waits on average), a historical average quantity of pickup associates for the physical store, and/or other suitable historical information about the physical store.

In a number of embodiments, the dynamic wait time data for the physical store can include an average hourly wait time at the physical store for each time slot that occurred before the selected time slot during the selected date (e.g., how long the average wait time was during each of the previous hour-long time slot of the day), an average daily wait time at the physical store on each day of a week ending on a day immediately preceding the selected date (e.g., how long the average wait time was during the entire day of each of the previous seven days), an average day-of-the-week wait time at the physical store on each occurrence of a weekday corresponding to the selected date over a previous four-week period (e.g., if the pickup is scheduled for a Tuesday, how long the average wait time was on the previous four Tuesdays), and/or other suitable dynamic wait time data for the physical store.

In a number of embodiments, the input data also can include the difference between the predicted arrival time and selected time slot. In many embodiments, the input data does not include the number of associates that will be available at the physical store to dispense pickup orders for the selected time slot, as this information may not be available at the time of check-in.

In many embodiments, the machine learning model can be a gradient boosting model, as described above. Once the machine learning model has been trained, the model can be used with the input data, as described above, to predict output data. For example, in XGBoost, the trained model can be used with the prediction function to generate the estimated wait time. In many embodiments, the estimated wait time can be determined using the historical and dynamic data described above as input, which can advantageously determine an estimated wait time in a dynamic environment in which there are "walk-in" users that did not check-in and other uncertainties that make conventional subjective estimates unreliable.

In several embodiments, method 400 further can include a block 440 of sending the estimated wait time to the physical store and/or the mobile device of the user. For example, the estimated wait time can be sent to the mobile application on the mobile device of the user to alert the user about how long the user can expect to wait after arriving at the physical store until the dispensing of the order is complete. This estimated wait time information can beneficially allow the user to plan their time. Additionally this information can be sent to the physical store, which can allow the plan and allocate resources, as described above.

In a number of embodiments, method 400 optionally can include a block 445 of determining that the estimated wait time exceeds a predetermined threshold. For example, the predetermined threshold can be 5 minutes, 10 minutes, 15 minutes, 20 minutes, 25 minutes, 30 minutes, or another suitable length of time. In some embodiments, the predetermined threshold can be set by each of the physical stores. In other embodiments, the predetermined threshold can be the same for all of the physical stores. In yet other embodiments, the user can set the predetermined threshold, such as when first submitting an online grocery pickup order.

In several embodiments, method 400 further can include a block 450 of sending a message to the user with a suggested later arrival time. For example, if the estimated wait time exceeds the predetermined threshold, the user can be notified of one or more later arrival times in which the wait time would be shorter. In several embodiments, the message can allow the user to select the one of the one or more later arrival times to indicate that the user will plan to arrive at that later time, and/or to decline to arrive later, in which case the user can go to the physical store and wait for the order to be dispensed.

Figure 5:
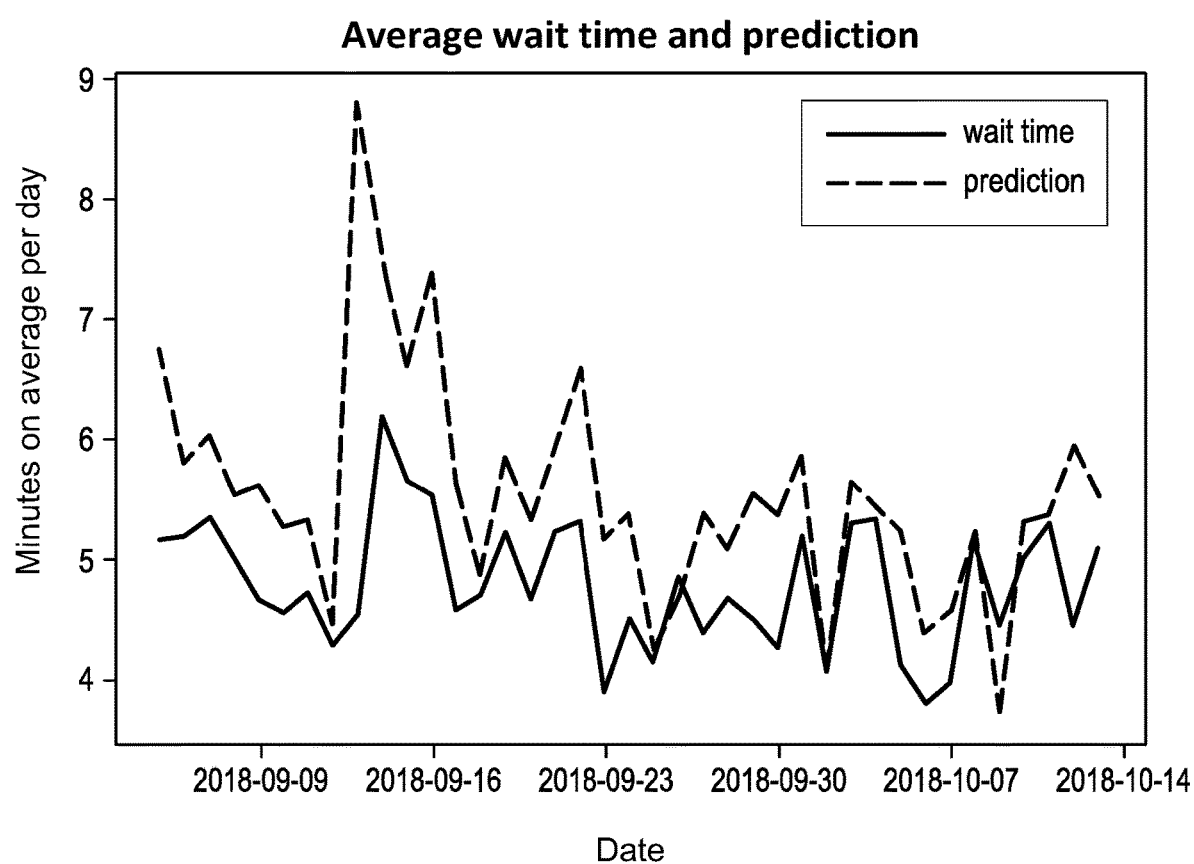
FIG. 5 illustrates a graph showing test results for predicting estimated wait times with a gradient boosting model using data from a specific physical store over a ten month period.

Turning ahead to next drawing, FIG. 5 illustrates a graph 500 showing test results for predicting estimated wait times with a gradient boosting model using data from a specific physical store over a ten month period. Specifically, the pickup orders occurred from Jan. 29, 2018 to Oct. 17, 2018, which included a total of 27,053 orders. This data was split into a training set using the pickup orders that occurred before Sep. 5, 2018, which included 21,642 orders, and a test set using the pickup orders that occurred on or after Sep. 5, 2018, which included 5, 411 orders. The training data was used to train the XGBoost gradient boosting model. Then, for each order in the test data, the test data was used (without using the actual wait times) to predict estimated wait times, which were then compared against the actual wait times that occurred. A time range of plus or minus 2.5 minutes was used to set an accuracy criterion when comparing the estimated wait times to the actual wait times. In other words, if the estimated wait time was 8 minutes, the prediction was counted as a positive outcome if the actual wait time was within plus or minus 2.5 minutes of 8 minutes (e.g., 5.5 minutes to 10.5 minutes).

First, the model was tested using input data that included the historical information described above, but did not include the dynamic information described above, which resulted in 66.48% positive outcomes. This result was significantly better than using the average time wait time from the previous day, which resulted in 38.26% positive outcomes. Next, the model was testing using the input data that included both the historical information and the dynamic information, which resulted 73.76% positive outcomes, which was an additional improvement.

FIG. 5 shows a first plot of the daily average of the estimated or predicted wait times, which were calculated using the model. FIG. 5 also shows a second plot of the daily average of the actual wait times that occurred during each of the days. FIG. 5 shows that actual wait time varies from day to day, and the model dynamically predicts wait times in a manner that generally fits in the face of uncertain and dynamically changing conditions.

Returning to FIG. 3, in several embodiments, communication system 311 can at least partially perform block 410 (FIG. 4) of receiving an order from a user for a pickup from a physical store during a selected time slot of a selected date, block 415 (FIG. 4) of sending a notification to the user that the order is ready to be picked up by the user, block 420 (FIG. 4) of receiving a check-in message from a mobile device of the user, block 440 (FIG. 4) of sending the estimated wait time to the physical store and/or the mobile device of the user, and/or block 450 (FIG. 4) of sending a message to the user with a suggested later arrival time.

In several embodiments, order system 312 can at least partially perform block 410 (FIG. 4) of receiving an order from a user for a pickup from a physical store during a selected time slot of a selected date, and/or block 425 (FIG. 4) of adding the order to a queue of assembled checked-in orders for the physical store.

In a number of embodiments, tracking system 313 can at least partially perform block 430 (FIG. 4) of determining an estimated arrival time based on geo-tracking of the mobile device of the user.

In several embodiments, wait determination system 314 can at least partially perform block 405 (FIG. 4) of training a machine learning model based on historical input data for pickups by users that occurred during a historical time period and output data comprising actual wait times that occurred for the pickups by the users, block 435 (FIG. 4) of generating an estimated wait time using the machine learning model, as trained, and based on input data comprising the estimated arrival time, order information for each assembled checked-in order in the queue of assembled checked-in orders, historical information about the user, historical information about the physical store, and dynamic wait time data for the physical store, and/or block 445 (FIG. 4) of determining that the estimated wait time exceeds a predetermined threshold.

In a number of embodiments, order queue system 362 can at least partially perform block 425 (FIG. 4) of adding the order to a queue of assembled checked-in orders for the physical store.

In many embodiments, the techniques described herein can provide a practical application and several technological improvements. In some embodiments, the techniques described herein can provide for automatic determination of pickup wait times using specific input data and a machine learning model to provide estimates in the face of uncertain conditions. These techniques described herein can provide a significant improvement over conventional approaches of subjectively estimating wait times, such as guesses about how long the wait might take. Moreover, these estimates are improvements over other possible approaches, such as estimating the wait time based on an average of wait times during the previous day. In many embodiments, the techniques described herein can beneficially make determinations based on dynamic information that describes current conditions and/or conditions that have occurred during the same day of the scheduled pickup.

In many embodiments, the machine learning model can be pre-trained, but can also consider both historical and dynamic input from each store with current data in each time slot. In many embodiments, the techniques described herein can estimate wait times even when there are peak hours, holiday surges, or other rare situations, based on the use of current, dynamic data.

In many embodiments, the techniques described herein can beneficially use current geo-location information for the users to build a queue of checked-in orders at the physical store before the arrival of the users to pick up their orders. In several embodiments, a machine learning model can use extensive data inputs to predict the wait time even when there is a significant, variable possibility of users who did not first check-in. For example, 30-70% of the users can show up for pickup without first checking in.

In a number of embodiments, the techniques described herein can advantageously provide a consistent user experience by determining estimated wait times across varying and uncertain conditions based on current information and a predictive model. In various embodiments, the techniques described herein can dynamically determine the estimated wait time before the user leaves to pick up the order, which can allow the user to plan, and/or allow the user to reschedule the pickup time.

In many embodiments, the techniques described herein can be used continuously at a scale that cannot be handled using manual techniques. For example, the number of monthly pickups at each store can exceed a few thousand.

In a number of embodiments, the techniques described herein can solve a technical problem that arises only within the realm of computer networks, as online grocery orders do not exist outside the realm of computer networks. Moreover, the techniques described herein can solve a technical problem that cannot be solved outside the context of computer networks. Specifically, the techniques described herein cannot be used outside the context of computer networks, in view of a lack of data, and because the machine learning model cannot be performed without a computer.

Various embodiments include a system. The system can include one or more processors and one or more non-transitory computer-readable media storing computing instructions configured to run on the one more processors and perform certain acts. The acts can include training a machine learning model based on historical input data for pickups by users that occurred during a historical time period and output data comprising actual wait times that occurred for the pickups by the users. The acts also can include receiving an order from a user for a pickup from a physical store during a selected time slot of a selected date. After items for the order have been picked and assembled at the physical store, the acts further can include sending a notification to the user that the order is ready to be picked up by the user. The acts additionally can include receiving a check-in message from a mobile device of the user. The acts also can include adding the order to a queue of assembled checked-in orders for the physical store. The acts further can include determining an estimated arrival time based on geo-tracking of the mobile device of the user. The acts additionally can include generating an estimated wait time using the machine learning model, as trained, and can be based on input data. The input data can comprise the estimated arrival time, order information for each assembled checked-in order in the queue of assembled checked-in orders, historical information about the user, historical information about the physical store, and dynamic wait time data for the physical store. The acts further can include sending the estimated wait time to at least one of the physical store or the mobile device of the user.

Several embodiments can include a method. The method can be implemented via execution of computing instructions configured to run at one or more processors and stored at one or more non-transitory computer-readable media. The method can include training a machine learning model based on historical input data for pickups by users that occurred during a historical time period and output data comprising actual wait times that occurred for the pickups by the users. The method also can include receiving an order from a user for a pickup from a physical store during a selected time slot of a selected date. After items for the order have been picked and assembled at the physical store, the method further can include sending a notification to the user that the order is ready to be picked up by the user. The method additionally can include receiving a check-in message from a mobile device of the user. The method also can include adding the order to a queue of assembled checked-in orders for the physical store. The method further can include determining an estimated arrival time based on geo-tracking of the mobile device of the user. The method additionally can include generating an estimated wait time using the machine learning model, as trained, and based on input data. The input data can comprise the estimated arrival time, order information for each assembled checked-in order in the queue of assembled checked-in orders, historical information about the user, historical information about the physical store, and dynamic wait time data for the physical store. The method further can include sending the estimated wait time to at least one of the physical store or the mobile device of the user.

Although automatic determination of pickup wait times has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within online grocery order system 310 and/or store system 361 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
   training a machine learning model based on historical input data for pickups by users that occurred during a historical time period and output data comprising actual wait times that occurred for the pickups by the users;
   receiving an order from a user for a pickup from a physical store during a selected time slot of a selected date;
   after items for the order have been picked and assembled at the physical store, sending a notification to the user that the order is ready to be picked up by the user;

receiving a check-in message from a mobile device of the user;

adding the order to a queue of assembled checked-in orders for the physical store;

determining an estimated arrival time based on geo-tracking of the mobile device of the user;

generating an estimated wait time using the machine learning model, as trained, and based on input data comprising the estimated arrival time, order information for each assembled checked-in order in the queue of assembled checked-in orders, historical information about the user, historical information about the physical store, and dynamic wait time data for the physical store; and sending the estimated wait time to at least one of the physical store or the mobile device of the user.

2. The system of claim 1, wherein the estimated wait time comprises a range of time periods within a predetermined confidence interval.

3. The system of claim 2, wherein the predetermined confidence interval is approximately 90%.

4. The system of claim 1, wherein the order for the pickup is a grocery order for a grocery pickup.

5. The system of claim 1, wherein the order information comprises:
   a quantity of orders in the queue of assembled checked-in orders;
   a quantity of bags in the each assembled checked-in order in the queue of assembled checked-in orders;
   whether the order is a delivery; and
   whether the order is an express order.

6. The system of claim 1, wherein:
   the historical information about the user comprises:
      a historical average wait time for the user; and
      a historical check-in percentage for the user; and
   the historical information about the physical store comprises:
      a historical average wait time for the physical store; and
      a historical average quantity of pickup associates for the physical store.

7. The system of claim 1, wherein the dynamic wait time data for the physical store comprises:
   an average hourly wait time at the physical store for each time slot that occurred before the selected time slot during the selected date;
   an average daily wait time at the physical store on each day of a week ending on a day immediately preceding the selected date; and
   an average day-of-the-week wait time at the physical store on each occurrence of a weekday corresponding to the selected date over a previous four-week period.

8. The system of claim 1, wherein:
   the physical store comprises multiple pickup lanes.

9. The system of claim 1, wherein:
   the machine learning model comprises a gradient boosting model.

10. The system of claim 1, wherein the computing instructions are further configured to perform:
    determining that the estimated wait time exceeds a predetermined threshold; and
    sending a message to the user with a suggested later arrival time.

11. A method being implemented via execution of computing instructions configured to run at one or more processors and stored at one or more non-transitory computer-readable media, the method comprising:

training a machine learning model based on historical input data for pickups by users that occurred during a historical time period and output data comprising actual wait times that occurred for the pickups by the users;

receiving an order from a user for a pickup from a physical store during a selected time slot of a selected date;

after items for the order have been picked and assembled at the physical store, sending a notification to the user that the order is ready to be picked up by the user;

receiving a check-in message from a mobile device of the user;

adding the order to a queue of assembled checked-in orders for the physical store;

determining an estimated arrival time based on geo-tracking of the mobile device of the user;

generating an estimated wait time using the machine learning model, as trained, and based on input data comprising the estimated arrival time, order information for each assembled checked-in order in the queue of assembled checked-in orders, historical information about the user, historical information about the physical store, and dynamic wait time data for the physical store; and sending the estimated wait time to at least one of the physical store or the mobile device of the user.

12. The method of claim 11, wherein the estimated wait time comprises a range of time periods within a predetermined confidence interval.

13. The method of claim 12, wherein the predetermined confidence interval is approximately 90%.

14. The method of claim 11, wherein the order for the pickup is a grocery order for a grocery pickup.

15. The method of claim 11, wherein the order information comprises:
    a quantity of orders in the queue of assembled checked-in orders;
    a quantity of bags in the each assembled checked-in order in the queue of assembled checked-in orders;
    whether the order is a delivery; and
    whether the order is an express order.

16. The method of claim 11, wherein:
    the historical information about the user comprises:
       a historical average wait time for the user; and
       a historical check-in percentage for the user; and
    the historical information about the physical store comprises:
       a historical average wait time for the physical store; and
       a historical average quantity of pickup associates for the physical store.

17. The method of claim 11, wherein the dynamic wait time data for the physical store comprises:
    an average hourly wait time at the physical store for each time slot that occurred before the selected time slot during the selected date;
    an average daily wait time at the physical store on each day of a week ending on a day immediately preceding the selected date; and
    an average day-of-the-week wait time at the physical store on each occurrence of a weekday corresponding to the selected date over a previous four-week period.

18. The method of claim 11, wherein:
    the physical store comprises multiple pickup lanes.

19. The method of claim 11, wherein:
    the machine learning model comprises a gradient boosting model.

20. The method of claim 11 further comprising:
  determining that the estimated wait time exceeds a predetermined threshold; and
  sending a message to the user with a suggested later arrival time.

\* \* \* \* \*